Figure 1:
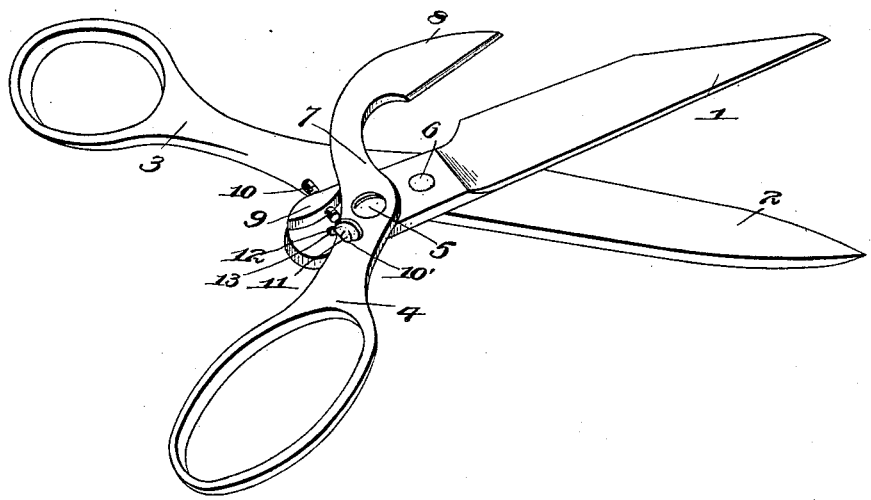

(No Model.)

C. COATES.
COMBINATION SHEARS AND BUTTONHOLE CUTTER.

No. 606,123. Patented June 21, 1898.

Witnesses
C. C. Hunt.
H. L. Amer.

Inventor
Clarence Coates,
by V. T. Stockbridge.
his Attorney.

UNITED STATES PATENT OFFICE.

CLARENCE COATES, OF CLIFTONDALE, MASSACHUSETTS.

COMBINATION SHEARS AND BUTTONHOLE-CUTTER.

SPECIFICATION forming part of Letters Patent No. 606,123, dated June 21, 1898.

Application filed July 19, 1897. Serial No. 645,053. (No model.)

*To all whom it may concern:*

Be it known that I, CLARENCE COATES, of Cliftondale, in the county of Essex and State of Massachusetts, have invented certain new and useful Improvements in a Combination Shears and Buttonhole-Cutter; and I do hereby declare the following to be a full, clear, and exact description of the invention, such as will enable others skilled in the art to which it appertains to make and use the same.

This invention relates to shears; and the objects in view are to provide, in connection with a pair of shears, a buttonhole-cutter, at the same time making provision whereby when the device is used as one article the blades of the other article may be fastened so as to prevent their operation. Provision is also made whereby the throw of the buttonhole-blade is limited and made adjustable, so as to adapt the same to form buttonholes of different sizes.

With these objects in view the invention consists in certain novel features and details of construction and arrangement of parts, as hereinafter fully set forth, illustrated in the drawings, and incorporated in the claims hereto appended.

Figure 2:
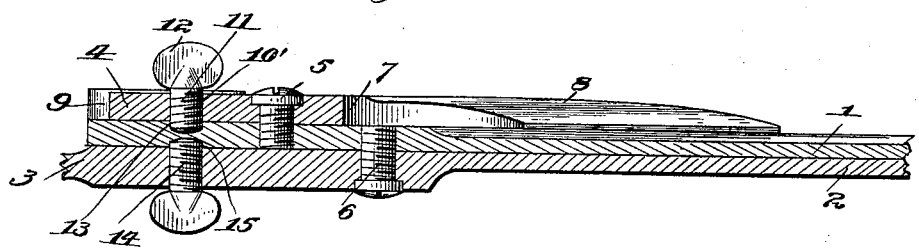

In the accompanying drawings, Figure 1 is a perspective view of the combined shears and buttonhole-cutter constructed in accordance with this invention. Fig. 2 is a detail cross-section taken in line with the set-screws.

Similar numerals of reference designate corresponding parts in both views.

Referring to the drawings, the combined shears and buttonhole-cutter is seen to comprise a pair of blades 1 and 2 and a pair of handles 3 and 4. One of the handles is formed integrally with its respective blade, while the other handle is formed separately from the main blade 1 and connected thereto pivotally by means of a screw or other suitable fastening 5. The main blades are connected by means of a screw or other fastener 6. The main pivot or fastener 6 is located in advance of the pivot 5 or between the pivot 5 and the points of the blades. The blade 1 is extended in rear of the pivot 6 to receive the pivot 5, and the handle 4 is deflected laterally, as shown at 7, and then extended along the side of the main blade to form a buttonhole-cutter 8, the active or working surface of which is equal to the longest desired buttonhole. The buttonhole-cutting blade 8 coöperates with the rear edge of one of the main blades, said edge being brought to the proper angle to act as such.

Connected to the heel end of the main blade, which carries the buttonhole-cutter, is a lug 9 into which is screwed an adjustable stop or screw 10, the inner end of which forms an abutment for the handle of the buttonhole-blade, so that by adjusting said stop or screw the relative movement between such handle and the blade to which it is pivotally connected is limited. By this means the size of the buttonhole may be regulated, as the buttonhole-cutter may be adjusted so as to cut its entire length or only a portion of its entire length.

The handle of the buttonhole-cutter is provided, near the pivot 5, with a threaded opening 10', in which is placed a binding-screw 11, having a large head 12, by means of which it may be turned for the purpose of bringing the inner end of such screw into engagement with a socket 13 in the heel end of the blade to which the buttonhole-cutter is connected. By moving said screw inward relative movement between said parts is prevented, thus adapting the device to be used as ordinary shears. The handle, which is formed integrally with its respective blade, is also provided with a threaded opening in which works a set-screw 14, the inner end of which is adapted to be received in a socket 15 in the heel end of the short main blade, so that by this means the main blades may be locked firmly together. When so locked, by loosening the binding-screw of the buttonhole-cutter the latter may be operated in connection with the short blade and be used for forming buttonholes in wearing-apparel, &c.

From the foregoing description it will be seen that the combined article may be used either as an ordinary pair of shears or as a buttonhole-cutter and that the parts may be so fastened that the device can be utilized for only one purpose at a time, thus adding greatly to the convenience of the article under either adjustment. It will also be seen that the size of the buttonhole may be regulated by increasing or diminishing the throw of the buttonhole-blade, and this may be accomplished by the movement of the adjustable stop.

Having thus described the invention, what is claimed as new is—

1. The combination with a pair of shears, of a handle formed separately from one of the shear-blades and pivotally connected thereto, a buttonhole-cutter carried by said handle, and means for retaining said handle in fixed relation to its respective blade, substantially as described.

2. The combination with a pair of shears having means for locking the blades against relative movement, of an auxiliary buttonhole-cutter connected to one of the shear-handles and adapted to coöperate with one of the shear-blades, and means for holding the buttonhole-cutter fixed relatively to the blade with which it coöperates, substantially as described.

In testimony whereof I have signed this specification in the presence of two subscribing witnesses.

CLARENCE COATES.

Witnesses:
M. R. GOODWIN,
GEO. S. NICHOLS.